United States Patent
Ishiba et al.

(10) Patent No.: US 11,034,799 B2
(45) Date of Patent: Jun. 15, 2021

(54) METHOD FOR MANUFACTURING POLYMER LATEX

(71) Applicant: ZEON CORPORATION, Tokyo (JP)

(72) Inventors: Masatoshi Ishiba, Tokyo (JP); Shunjin Aihara, Tokyo (JP); Junji Kodemura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 158 days.

(21) Appl. No.: 16/077,612

(22) PCT Filed: Feb. 16, 2017

(86) PCT No.: PCT/JP2017/005681
§ 371 (c)(1),
(2) Date: Aug. 13, 2018

(87) PCT Pub. No.: WO2017/150199
PCT Pub. Date: Sep. 8, 2017

(65) Prior Publication Data
US 2019/0055367 A1 Feb. 21, 2019

(30) Foreign Application Priority Data
Feb. 29, 2016 (JP) .............................. JP2016-037079

(51) Int. Cl.
| C08J 3/07 | (2006.01) |
| C08J 5/02 | (2006.01) |
| C08C 1/15 | (2006.01) |
| C08C 1/10 | (2006.01) |
| C08C 2/00 | (2006.01) |
| B29C 41/00 | (2006.01) |
| B29C 41/14 | (2006.01) |
| C09J 109/00 | (2006.01) |
| C09J 153/02 | (2006.01) |
| C08L 9/10 | (2006.01) |
| C08L 53/02 | (2006.01) |
| B29K 105/00 | (2006.01) |

(52) U.S. Cl.
CPC .............. *C08J 3/07* (2013.01); *B29C 41/003* (2013.01); *B29C 41/14* (2013.01); *C08C 1/10* (2013.01); *C08C 1/15* (2013.01); *C08C 2/00* (2013.01); *C08J 5/02* (2013.01); *C09J 109/00* (2013.01); *C09J 153/02* (2013.01); *B29K 2105/0064* (2013.01); *C08J 2309/00* (2013.01); *C08J 2353/02* (2013.01); *C08L 9/10* (2013.01); *C08L 53/02* (2013.01)

(58) Field of Classification Search
CPC ... C08J 3/07; C08J 5/02; C08J 2309/00; C08J 2353/02; B29C 41/003; B29C 41/14; C08C 1/15; C08C 1/10; C08C 2/00; C09J 109/00; C09J 153/02; B29K 2105/0064; C08L 9/10; C08L 53/02

USPC ......................................................... 264/299
See application file for complete search history.

(56) References Cited

U.S. PATENT DOCUMENTS

| 2009/0209698 A1 | 8/2009 | Van Der Huizen et al. |
| 2015/0087761 A1* | 3/2015 | Satoh .................. C08L 9/10 524/432 |
| 2015/0291858 A1* | 10/2015 | Nishimura ........... C09J 7/22 428/344 |

FOREIGN PATENT DOCUMENTS

| EP | 2980127 A1 | 2/2016 |
| JP | S55-142635 A | 11/1980 |
| JP | S56-109268 A | 8/1981 |
| JP | 2009-531497 A | 9/2009 |
| WO | 2013/099501 A1 | 7/2013 |
| WO | 2014/157034 A1 | 10/2014 |
| WO | 2014/181714 A1 | 11/2014 |

OTHER PUBLICATIONS

May 23, 2017 International Search Repiort issued in International Patent Application PCT/JP2017/005681.
Sep. 4, 2018 International Preliminary Report on Patentability issued in International Patent Application PCT/JP2017/005681.
Database WPI Week 201478. Thomson Scientific. London, Great Britain. 2014-U38995 XP002794077.
Oct. 18, 2019 Extended Search Report issued in European Patent Application No. 17759670.7.
Jan. 13, 2021 Office Action issued in European Patent Application No. 17759670.7.

* cited by examiner

Primary Examiner — Joseph S Del Sole
Assistant Examiner — Lawrence D. Hohenbrink, Jr.
(74) Attorney, Agent, or Firm — Oliff PLC

(57) ABSTRACT

A method for producing a polymer latex, including an emulsification step of mixing a polymer solution obtained by dissolution of synthetic polyisoprene and/or a styrene-isoprene-styrene block copolymer in an organic solvent, with an aqueous solution including 0.1 to 30 parts by weight of a rosinate based on 100 parts by weight in total of the synthetic polyisoprene and the styrene-isoprene-styrene block copolymer, and emulsifying the resultant in water to thereby obtain an emulsified liquid, a solvent removal step of removing the organic solvent in the emulsified liquid, and a concentration step of concentrating the emulsified liquid from which the organic solvent is removed, and also adjusting the content rate of the rosinate in the emulsified liquid after concentration, in the range of 0.1 to 3 parts by weight based on 100 parts by weight in total of the synthetic polyisoprene and the styrene-isoprene-styrene block copolymer in the emulsified liquid.

9 Claims, No Drawings

METHOD FOR MANUFACTURING POLYMER LATEX

TECHNICAL FIELD

The present invention relates to a method for producing a polymer latex that is excellent in productivity and mechanical stability, and that can provide a dip molded article high in tensile strength.

BACKGROUND ART

It has been conventionally known that a dip molded article for use in contact with the human body, such as a nipple, an air ball, a glove, a balloon and a sack, is obtained by dip molding of a latex composition containing a latex of natural rubber. A latex of natural rubber, however, contains a protein causing an allergy symptom in the human body, and thus is problematic in terms of use in a dip molded article that is in direct contact with the mucous membrane or organs of a living body. Therefore, studies about use of not a latex of natural rubber, but a latex of synthetic polyisoprene or styrene-isoprene-styrene block copolymer have been increasingly made (Patent Document 1).

For example, Patent Document 1 discloses a method for producing an artificial latex, including a step of emulsifying a polymer solution obtained by dissolution of isoprene rubber in a hydrocarbon solvent, by an aqueous soap liquid including rosin-based soap, and thereafter performing removal of the hydrocarbon solvent and concentration. An artificial latex obtained by the technique of Patent Document 1, however, is not sufficient in productivity and mechanical stability, and also a dip molded article produced using the artificial latex may be inferior in tensile strength.

RELATED ART

Patent Document

Patent Document 1: National Publication of International Patent Application No. 2009-531497

SUMMARY OF THE INVENTION

Problem to be Solved by the Invention

The present invention has been made in view of such circumstances, and an object thereof is to provide a polymer latex that is excellent in productivity and mechanical stability, and that can provide a dip molded article high in tensile strength.

Means for Solving the Problem

The present inventors have made intensive studies in order to achieve the above object, and as a result, have found that the above object can be achieved by the following: when a polymer solution of synthetic polyisoprene and/or a styrene-isoprene-styrene block copolymer is mixed with an aqueous solution including a predetermined rate of a rosinate and the resultant is emulsified, and an organic solvent of the resulting emulsified liquid is removed and thereafter the emulsified liquid from which the organic solvent is removed is concentrated, the content rate of the rosinate is adjusted to be in a predetermined range; thereby leading to completion of the present invention.

That is, according to the present invention, there is provided a method for producing a polymer latex, including an emulsification step of mixing a polymer solution obtained by dissolution of synthetic polyisoprene and/or a styrene-isoprene-styrene block copolymer in an organic solvent, with an aqueous solution including 0.1 to 30 parts by weight of a rosinate based on 100 parts by weight in total of the synthetic polyisoprene and the styrene-isoprene-styrene block copolymer, and emulsifying the resultant in water to thereby obtain an emulsified liquid, a solvent removal step of removing the organic solvent in the emulsified liquid, and a concentration step of concentrating the emulsified liquid from which the organic solvent is removed, and also adjusting a content rate of the rosinate in the emulsified liquid in the range of 0.1 to 3 parts by weight based on 100 parts by weight in total of the synthetic polyisoprene and the styrene-isoprene-styrene block copolymer in the emulsified liquid.

It is preferable in the method for producing a polymer latex of the present invention that the emulsified liquid be concentrated by centrifugation in the concentration step.

It is preferable in the method for producing a polymer latex of the present invention that the centrifugation be performed under a condition of a centrifugal acceleration of 100 to 20,000 G.

It is preferable in the method for producing a polymer latex of the present invention that concentration be performed in the concentration step by use of, as the emulsified liquid, an emulsified liquid that is adjusted to have a solid content concentration in the range of 1 to 40% by weight.

It is preferable in the method for producing a polymer latex of the present invention that the emulsified liquid be concentrated such that a solid content concentration of the emulsified liquid after concentration in the concentration step is 40 to 70% by weight.

In addition, according to the present invention, there is provided a method for producing a latex composition, including a step of adding a crosslinking agent to a polymer latex obtained by the production method.

Furthermore, according to the present invention, there is provided a method for producing a dip molded article, including a step of dip molding a latex composition obtained by the production method.

Effects of Invention

According to the present invention, there can provide a polymer latex that is excellent in productivity and mechanical stability, and that can provide a dip molded article high in tensile strength, and a dip molded article that is obtained using such a polymer latex and that has a high tensile strength.

DESCRIPTION OF EMBODIMENTS

The production method of the present invention includes an emulsification step of mixing a polymer solution obtained by dissolution of synthetic polyisoprene and/or a styrene-isoprene-styrene block copolymer in an organic solvent, with an aqueous solution including 0.1 to 30 parts by weight of a rosinate based on 100 parts by weight in total of the synthetic polyisoprene and the styrene-isoprene-styrene block copolymer, and emulsifying the resultant in water to thereby obtain an emulsified liquid, a solvent removal step of removing the organic solvent in the emulsified liquid, and a concentration step of concentrating the emulsified liquid from which the organic solvent is removed, and also adjusting the content rate of the rosinate in the emulsified liquid in the range of 0.1 to 3 parts by weight based on 100 parts by weight in total of the synthetic polyisoprene and the styrene-isoprene-styrene block copolymer in the emulsified liquid.

Polymer Solution of Synthetic Polyisoprene

First, the polymer solution of synthetic polyisoprene for use in the production method of the present invention is described.

With respect to the polymer solution of synthetic polyisoprene for use in the present invention, the synthetic polyisoprene included may be a homopolymer of isoprene or may be obtained by copolymerization with other ethylenically unsaturated monomer copolymerizable with isoprene. The content of the isoprene unit in the synthetic polyisoprene is preferably 70% by weight or more, more preferably 90% by weight or more, further preferably 95% by weight or more, particularly preferably 100% by weight (homopolymer of isoprene) based on the total monomer unit from the viewpoint that a flexible dip molded article excellent in tensile strength is easily obtained.

Examples of such other ethylenically unsaturated monomer copolymerizable with isoprene include conjugated diene monomers other than isoprene, such as butadiene, chloroprene and 1,3-pentadiene; ethylenically unsaturated nitrile monomers such as acrylonitrile, methacrylonitrile, fumaronitrile and α-chloroacrylonitrile; vinyl aromatic monomers such as styrene and alkylstyrene; and ethylenically unsaturated carboxylic acid ester monomers such as methyl (meth)acrylate (which means "methyl acrylate and/or methyl methacrylate"; hereinafter, much the same is true on ethyl (meth)acrylate and the like), ethyl (meth)acrylate, butyl (meth)acrylate and 2-ethylhexyl (meth)acrylate. Such other ethylenically unsaturated monomers copolymerizable with isoprene may be used singly or in combinations of two or more kinds thereof.

The polymer solution of synthetic polyisoprene, for use in the present invention, can be obtained by, for example, solution polymerization of a monomer including isoprene and other ethylenically unsaturated monomer copolymerizable therewith, if necessary used, in an organic solvent by use of an alkyllithium polymerization catalyst such as n-butyllithium or sec-butyllithium. In particular, according to the present invention, the alkyllithium polymerization catalyst is desirably used to perform polymerization because the polymerization conversion rate can be preferably thus allowed to be 97% by weight or more, more preferably 99% by weight or more, thereby allowing the amount of the remaining monomer to be reduced, and therefore the amount of the remaining monomer in the resulting emulsified liquid can be decreased even in the case where the polymer solution obtained is directly emulsified without undergoing any step such as coagulation and re-dissolution for removal of the remaining monomer.

The amount of the polymerization catalyst used is preferably 0.0070 to 0.085 parts by weight, more preferably 0.0076 to 0.056 parts by weight, further preferably 0.0084 to 0.042 parts by weight based on 100 parts by weight of the monomer for use in polymerization, from the viewpoint that a polymer latex can be produced at a high productivity.

The organic solvent may be any organic solvent that is inert to the polymerization reaction, and examples thereof include aromatic hydrocarbon solvents such as benzene, toluene and xylene; alicyclic hydrocarbon solvents such as cyclopentane, cyclopentene, cyclohexane and cyclohexene; aliphatic hydrocarbon solvents such as pentane, hexane and heptane; and halogenated hydrocarbon solvents such as methylene chloride, chloroform and ethylene dichloride. Among them, alicyclic hydrocarbon solvents or aliphatic hydrocarbon solvents are preferable, and n-hexane and cyclohexane are particularly preferable. The amount of the organic solvent used is preferably 250 to 2000 parts by weight, more preferably 400 to 1250 parts by weight based on 100 parts by weight of the monomer for use in polymerization.

The polymerization temperature in solution polymerization of the monomer including isoprene and other ethylenically unsaturated monomer copolymerizable therewith, if necessary used, is preferably 40 to 80° C., more preferably 45 to 75° C. from the viewpoint that a polymer latex can be produced at a high productivity.

The polymer solution of synthetic polyisoprene can be thus obtained by solution polymerization of the monomer including isoprene in the production method of the present invention, and the polymer solution thus obtained by solution polymerization is preferably used as it is without coagulation and directly emulsified in water in the presence of a rosinate as an emulsifier in the production method of the present invention. Once the polymer solution is, for example, coagulated, the molecular weight distribution (Mw/Mn) of the synthetic polyisoprene may be too high due to heat history or the like in coagulation, consequently causing the resulting dip molded article to be inferior in tensile strength, and therefore the polymer solution is preferably used as it is without coagulation. In this case, for example, an organic solvent may be added in order to adjust the viscosity of the polymer solution, and the like.

The isoprene unit in the synthetic polyisoprene is present in the form of four types including a cis bond unit, a trans bond unit, a 1,2-vinyl bond unit and a 3,4-vinyl bond unit depending on the binding state of isoprene. The content rate of the cis bond unit in the isoprene unit included in the synthetic polyisoprene is preferably 70% by weight or more, more preferably 72% by weight or more, further preferably 75% by weight or more based on the total isoprene unit from the viewpoint of an enhancement in tensile strength of the resulting dip molded article.

The weight average molecular weight (Mw) of the synthetic polyisoprene is preferably 100,000 to 1,200,000, more preferably 150,000 to 1,100,000, further preferably 200,000 to 1,000,000 in tams of standard polystyrene by gel permeation chromatography analysis. The weight average molecular weight of the synthetic polyisoprene is in the above range, thereby resulting in a tendency to not only enhance the tensile strength of a dip molded article, but also easily produce a synthetic polyisoprene latex.

The molecular weight distribution represented by the ratio (Mw/Mn) of the weight average molecular weight (Mw) to the number average molecular weight (Mn) of the synthetic polyisoprene, is not particularly limited, and is usually 1 to 5, preferably 1.1 to 3, more preferably 1.2 to 2. The molecular weight distribution of the synthetic polyisoprene is in the above range, thereby more enhancing the tensile strength of a dip molded article.

Polymer Solution of Styrene-Isoprene-Styrene Block Copolymer

Next, the polymer solution of styrene-isoprene-styrene block copolymer for use in the production method of the present invention is described.

In the polymer solution of styrene-isoprene-styrene block copolymer for use in the present invention, the styrene-isoprene-styrene block copolymer is a block copolymer of styrene and isoprene, and the content ratio of the styrene unit and the isoprene unit in the styrene-isoprene-styrene block copolymer is usually in the range of 1:99 to 90:10, preferably 3:97 to 70:30, more preferably 5:95 to 50:50, further preferably 10:90 to 30:70 as the weight ratio of "styrene unit:isoprene unit".

In the polymer solution of styrene-isoprene-styrene block copolymer in the present invention, the styrene-isoprene-styrene block copolymer preferably has a molecular weight distribution (Mw/Mn) of 1.0 to 2.6, more preferably 1.0 to 2.4, further preferably 1.0 to 2.2. The molecular weight distribution (Mw/Mn) can be in the above range, thereby properly enhancing the tensile strength of the resulting dip molded article while suppressing an increase in the viscosity of the polymer solution obtained by dissolution of the styrene-isoprene-styrene block copolymer in the organic solvent. On the other hand, if the molecular weight distribution (Mw/Mn) is too large, the resulting dip molded article may be inferior in tensile strength.

Herein, when the polymer solution of styrene-isoprene-styrene block copolymer is emulsified in water in the presence of an emulsifier to thereby obtain an emulsified liquid, as described below, in the production method of the present invention, the polymer solution of styrene-isoprene-styrene block copolymer, actually used, is preferably a polymer solution having a viscosity at a temperature of 60° C., of about 20,000 cps (for example, a polymer solution having a viscosity at a temperature of 60° C. of 20,000 cps±100 cps) from the viewpoint that the solid content viscosity of the polymer solution of styrene-isoprene-styrene block copolymer can be more increased to thereby allow the production rate (the amount of production per unit time) in emulsification to be more increased.

The polymer solution of styrene-isoprene-styrene block copolymer for use in the present invention can be obtained by, for example, solution polymerization of a styrene-containing monomer and an isoprene-containing monomer in an organic solvent by use of an alkyllithium polymerization catalyst such as n-butyllithium or sec-butyllithium. In particular, according to the present invention, the alkyllithium polymerization catalyst is desirably used to perform polymerization because the polymerization conversion rate can be preferably thus allowed to be 97% by weight or more, more preferably 99% by weight or more, thereby allowing the amount of the remaining monomer to be reduced, and therefore the amount of the remaining monomer in the resulting emulsified liquid can be decreased even in the case where the polymer solution obtained is directly emulsified without undergoing any step such as coagulation and re-dissolution for removal of the remaining monomer.

The amount of the polymerization catalyst used is preferably 0.030 to 0.34 parts by weight, more preferably 0.038 to 0.24 parts by weight, further preferably 0.044 to 0.17 parts by weight based on 100 parts by weight of the monomer for use in polymerization, from the viewpoint that a polymer latex can be produced at a high productivity.

The organic solvent may be any organic solvent that is inert to the polymerization reaction, and, for example, the above organic solvent can be used. The amount of the organic solvent used is preferably 75 to 570 parts by weight, more preferably 80 to 400 parts by weight based on 100 parts by weight of the monomer for use in polymerization.

The polymerization temperature in solution polymerization of the styrene-containing monomer and the isoprene-containing monomer is preferably 35 to 80° C., more preferably 40 to 75° C. from the viewpoint that a polymer latex can be produced at a high productivity.

The polymer solution of styrene-isoprene-styrene block copolymer can be thus obtained by solution polymerization of the styrene-containing monomer and the isoprene-containing monomer in the production method of the present invention, and the polymer solution thus obtained by solution polymerization is preferably used as it is without coagulation and directly emulsified in water in the presence of a rosinate as an emulsifier in the production method of the present invention. Once the polymer solution is, for example, coagulated, the molecular weight distribution (Mw/Mn) of the styrene-isoprene-styrene block copolymer may be too high due to heat history or the like in coagulation, consequently causing the resulting dip molded article to be inferior in tensile strength, and therefore the polymer solution is preferably used as it is without coagulation. In this case, for example, an organic solvent may be added in order to adjust the viscosity of the polymer solution, and the like.

The weight average molecular weight (Mw) of the styrene-isoprene-styrene block copolymer is preferably 50,000 to 500,000, more preferably 70,000 to 400,000, further preferably 100,000 to 350,000 in terms of standard polystyrene by gel permeation chromatography analysis. The weight average molecular weight of the styrene-isoprene-styrene block copolymer is in the above range, thereby resulting in a tendency to not only enhance the tensile strength of a dip molded article, but also easily produce a styrene-isoprene-styrene block copolymer latex.

Emulsification Step

The emulsification step in the production method of the present invention is a step of mixing the above-mentioned polymer solution of synthetic polyisoprene and/or a styrene-isoprene-styrene block copolymer with an aqueous solution including a rosinate as an emulsifier and emulsifying the resultant in water to thereby obtain an emulsified liquid.

In the aqueous solution including a rosinate for use in the present invention, the content rate of the rosinate is 0.1 to 30 parts by weight, preferably 1 to 20 parts by weight, more preferably 3 to 15 parts by weight based on 100 parts by weight in total of the synthetic polyisoprene and the styrene-isoprene-styrene block copolymer in the polymer solution. The content rate of the rosinate can be in the above range, thereby not only suppressing foaming of the emulsified liquid in removal of the organic solvent in a solvent removal step described below, to enhance the productivity of a polymer latex, but also suppressing the occurrence of an aggregate (coagulum) in the emulsified liquid, to enhance mechanical stability of the emulsified liquid. Furthermore, the resulting dip molded article is enhanced in tensile strength.

As described above, it is preferable in the emulsification step in the production method of the present invention that the polymer solution obtained by the above-mentioned polymerization method be used as the polymer solution of synthetic polyisoprene and/or a styrene-isoprene-styrene block copolymer as it is without coagulation and emulsified in water in the presence of a surfactant. On the contrary, once the polymer solution is, for example, coagulated, the molecular weight distribution (Mw/Mn) of the synthetic polyisoprene and/or the styrene-isoprene-styrene block copolymer may be too high due to heat history or the like in coagulation, consequently causing the resulting dip molded article to be inferior in tensile strength, and on the other hand, the polymer solution can be used as it is without coagulation and emulsified, thereby allowing the occurrence of such failure to be suppressed.

The rosinate for use in the present invention is a fatty acid salt soap obtained from a rosin acid (containing abietic acid, neoabietic acid, palustric acid, pimaric acid, isopimaric acid, dehydroabietic acid, or the like), and is preferably an alkali metal salt of a rosin acid, and particularly preferably potassium rosinate or sodium rosinate because such an metal salt of a rosin acid is high in suppression effect of foaming of the emulsified liquid in removal of the organic solvent in a solvent removal step described below.

Herein, an emulsifier other than the rosinate may be used in combination as an emulsifier in addition to the rosinate in the production method of the present invention as long as the effect of the present invention is not impaired.

The emulsifier that can be used in combination with the rosinate is not particularly limited, and an anionic surfactant can be preferably used. Examples of the anionic surfactant include fatty acid salts such as sodium laurate, potassium myristate, sodium palmitate, potassium oleate, and sodium linoleate; alkylbenzenesulfonic acid salts such as sodium dodecylbenzenesulfonate, potassium dodecylbenzenesulfonate, sodium decylbenzenesulfonate, potassium decylbenzenesulfonate, sodium cetylbenzenesulfonate and potassium cetylbenzenesulfonate; alkylsulfosuccinic acid salts such as sodium di(2-ethylhexyl) sulfosuccinate, potassium di(2-ethylhexyl)sulfosuccinate and dioctyl sodium sulfosuccinate; alkylsulfuric acid ester salts such as sodium lauryl sulfate and potassium lauryl sulfate; polyoxyethylene alkyl ether sulfuric acid salts such as sodium polyoxyethylene lauryl ether sulfate and potassium polyoxyethylene lauryl ether sulfate; and monoalkylphosphoric acid salts such as sodium lauryl phosphate and potassium lauryl phosphate.

Among these anionic surfactants, fatty acid salts, alkylbenzenesulfonic acid salts, alkylsulfosuccinic acid salts, alkylsulfuric acid ester salts and polyoxyethylene alkyl ether sulfuric acid salts are preferable, and fatty acid salts and alkylbenzenesulfonic acid salts are particularly preferable.

It is preferable to use at least one selected from the group consisting of alkylbenzenesulfonic acid salts, alkylsulfosuccinic acid salts, alkylsulfuric acid ester salts and polyoxyethylene alkyl ether sulfuric acid ester salts and it is particularly preferable to use any alkylbenzenesulfonic acid salt, as the emulsifier for use in combination with the rosinate, because the occurrence of an aggregate in production of a polymer latex is suppressed. Here, preferable alkylbenzenesulfonic acid salts are sodium dodecylbenzenesulfonate and potassium dodecylbenzenesulfonate.

Furthermore, a surfactant other than the anionic surfactant may be used in combination as an emulsifier in addition to the rosinate in the production method of the present invention, and examples of such a surfactant other than the anionic surfactant include copolymerizable surfactants such as α,β-unsaturated carboxylic acid sulfoester, α,β-unsaturated carboxylic acid sulfate ester and sulfoalkyl aryl ether.

Any nonionic surfactant such as polyoxyethylene alkyl ether, polyoxyethylene alkylphenol ether, polyoxyethylene alkyl ester or polyoxyethylene sorbitan alkyl ester may be used as long as such a nonionic surfactant does not inhibit coagulation by a coagulating agent for use in dip molding.

When the emulsifier other than the rosinate is used in combination, the amount of the emulsifier used, other than the rosinate, is preferably 30 parts by weight or less, more preferably 20 parts by weight or less, further preferably 10 parts by weight or less based on 100 parts by weight in total of the synthetic polyisoprene and the styrene-isoprene-styrene block copolymer included in the polymer solution.

The amount of water for use in the emulsification step in the production method of the present invention is preferably 10 to 1,000 parts by weight, more preferably 30 to 500 parts by weight, most preferably 50 to 100 based on 100 parts by weight of the polymer solution of synthetic polyisoprene and styrene-isoprene-styrene block copolymer (organic solvent solution). Examples of the types of water used include hard water, soft water, ion-exchange water, distilled water and zeolite water, and soft water, ion-exchange water and distilled water are preferable.

When the polymer solution of synthetic polyisoprene and/or a styrene-isoprene-styrene block copolymer is emulsified in water in the presence of the rosinate as the emulsifier, an emulsifying apparatus commonly commercially available as an emulsifying machine or a dispersing machine can be used without any particular limitation. The method for adding the surfactant to the polymer solution of synthetic polyisoprene and/or a styrene-isoprene-styrene block copolymer is not particularly limited, and the surfactant may be added to any one or both of water and the polymer solution of synthetic polyisoprene and/or a styrene-isoprene-styrene block copolymer, may be added to the emulsified liquid during an emulsifying operation, or may be added collectively or in portions.

As the emulsifying apparatus, for example, a batch type emulsifying machine such as trade name "Homogenizer" (manufactured by IKA), trade name "Polytron" (manufactured by Kinematica) or trade name "TK Auto Homomixer" (manufactured by Primix Corporation); a continuous emulsifying machine such as trade name "TK-pipeline homomixer" (manufactured by Primix Corporation), trade name "Colloid Mill" (manufactured by Shinko Pantech Co., Ltd.), trade name "Slusher" (manufactured by Nippon Coke & Engineering. Co., Ltd.), trade name "Trigonal wet fine pulverizer" (manufactured by Mitsui Miike Machinery Co., Ltd.), trade name "Cavirton" (manufactured by Eurotech Co., Ltd.), trade name "Milder" (manufactured by Pacific Machinery & Engineering Co., Ltd.) or trade name "Fine flow mill" (manufactured by Pacific Machinery & Engineering Co., Ltd.); a high-pressure emulsifying machine such as trade name "Microfluidizer" (manufactured by Mizuho Industrial Co., Ltd.), trade name "Nanomizer" (manufactured by Nanomizer Inc.) or trade name "APV Gaulin" (manufactured by APV Gaulin Inc.); a membrane emulsifying machine such as trade name "Membrane emulsifying machine" (manufactured by Reica Co., Ltd.); a vibration type emulsifying machine such as trade name "Vibromixer" (manufactured by Reica Co., Ltd.); or an ultrasonic emulsifying machine such as trade name "Ultrasonic homogenizer" (manufactured by Branson Ultrasonics, Emerson Japan, Ltd.); can be used. Herein, the emulsifying operation conditions by the emulsifying apparatus are not particularly limited, and the treatment temperature and the treatment time may be appropriately selected so that a desired dispersing state is achieved.

Solvent Removal Step

The solvent removal step in the production method of the present invention is a step of removing the organic solvent from the emulsified liquid obtained in the emulsification step. The method for removing the organic solvent from the emulsified liquid is preferably a method which enables the content of the organic solvent (preferably aliphatic hydrocarbon solvent) in the emulsified liquid to be 500 ppm by weight or less, a method of distillation under reduced pressure, atmospheric distillation, steam distillation, centrifugation or the like can be adopted, and among them, distillation under reduced pressure is preferable from the viewpoint that the organic solvent can be properly and effectively removed.

In the production method of the present invention, the rosinate is used as the emulsifier and the amount thereof used is in the above range in the emulsification step, and therefore foaming of the emulsified liquid in solvent removal by distillation under reduced pressure can be suppressed, thereby enhancing production efficiency.

To the emulsified liquid from which the organic solvent is removed may be compounded additive(s) commonly compounded in the latex field, such as a pH adjuster, a defoamer, a preservative, a chelating agent, an oxygen scavenger, a dispersing agent and an antioxidant.

Examples of the pH adjuster include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and alkali metal hydroxide or ammonia is preferable.

Concentration Step

The concentration step in the production method of the present invention is a step of concentrating the emulsified liquid from which the organic solvent is removed in the solvent removal step, and also adjusting the content rate of the rosinate in the emulsified liquid in the range of 0.1 to 3 parts by weight based on 100 parts by weight in total of the synthetic polyisoprene and the styrene-isoprene-styrene block copolymer in the emulsified liquid, in concentration of the emulsified liquid, to thereby obtain a polymer latex.

The method for concentrating the emulsified liquid from which the organic solvent is removed is not particularly limited, a method such as distillation under reduced pressure, atmospheric distillation, centrifugation, or membrane concentration can be used, and centrifugation is preferable from the viewpoint that not only the solid content concentration of the resulting polymer latex is increased, but also the remaining amount of the emulsifier in the polymer latex can be reduced.

Centrifugation can be performed using, for example, a continuous centrifuge machine or a batch type centrifuge machine, and is preferably performed using a continuous centrifuge machine from the viewpoint that productivity of the polymer latex is excellent. When the emulsified liquid is concentrated by centrifugation, the polymer latex can be obtained as a light liquid which is a part of a dispersion liquid after centrifugation. Therefore, centrifugation can allow a desired amount of the rosinate for removal to be included in the remaining liquid after the polymer latex as a light liquid is removed, thereby allowing the remaining amount of the rosinate in the resulting polymer latex to be properly adjusted.

In the concentration step in the production method of the present invention, not only concentration of the polymer latex is performed, but also the remaining amount of the rosinate in the emulsified liquid after concentration is adjusted to 0.1 to 3 parts by weight, preferably 0.1 to 2.5 parts by weight, more preferably 0.1 to 2.0 parts by weight based on 100 parts by weight of the synthetic polyisoprene and the styrene-isoprene-styrene block copolymer in the emulsified liquid. According to the production method of the present invention, the remaining amount of the rosinate in the emulsified liquid after the concentration step can be in the above range, thereby enhancing the mechanical stability of the polymer latex, and also allowing the resulting dip molded article to be excellent in tensile strength. If the remaining amount of the rosinate in the emulsified liquid after the concentration step is too small, the resulting polymer latex is inferior in mechanical stability. On the other hand, if the remaining amount of the rosinate in the emulsified liquid after the concentration step is too small, the resulting dip molded article is inferior in tensile strength.

Examples of the method for allowing the remaining amount of the rosinate in the emulsified liquid after the concentration step to be in the above range include, but are not particularly limited, a method for adjusting the solid content concentration of the emulsified liquid in concentration by centrifugation and a method for adjusting conditions in centrifugation in ranges described below.

The solid content concentration of the emulsified liquid (the emulsified liquid before centrifugation) for use in centrifugation is preferably 1 to 40% by weight, more preferably 5 to 35% by weight, further preferably 10 to 20% by weight. The solid content concentration of the emulsified liquid before centrifugation is preferably in the above range because the synthetic polyisoprene and/or styrene-isoprene-styrene block copolymer can be prevented from aggregating during centrifugation, thereby not only enhancing the mechanical stability of the emulsified liquid, but also properly adjusting the amount of the rosinate in the resulting polymer latex to a desired amount, to thereby also suppress the occurrence of any aggregate (coagulum) in the emulsified liquid, to enhance the mechanical stability of the emulsified liquid and further more enhance the tensile strength of the resulting dip molded article. Herein, when centrifugation is performed, the emulsified liquid which undergoes the solvent removal step may be used as it is, or the emulsified liquid may be used after the solid content concentration is adjusted.

A pH adjuster is preferably added in advance to adjust the pH of the emulsified liquid to 7 or more, more preferably 9 or more for an enhancement in mechanical stability of the emulsified liquid. As the pH adjuster, alkali metal hydroxide such as sodium hydroxide or potassium hydroxide, or ammonia is preferable.

The centrifugal acceleration is preferably 100 to 20,000 G, more preferably 500 to 20,000 G, further preferably 1000 to 15,000 G. The centrifugal acceleration can be in the above range, thereby preventing the synthetic polyisoprene and/or styrene-isoprene-styrene block copolymer and/or the like from aggregating during centrifugation, to thereby not only enhance the mechanical stability of the emulsified liquid, but also allow the solid content concentration of the resulting polymer latex to be proper, to enhance the tensile strength of a dip molded article obtained by use of the polymer latex.

The time for centrifugation is preferably 0.5 to 300 minutes, more preferably 1 to 100 minutes, further preferably 1 to 50 minutes.

Furthermore, when centrifugation is performed by use of a continuous centrifuge machine, the flow rate for feeding the emulsified liquid to the centrifuge machine is preferably 500 to 1700 Kg/hr and the back pressure (gauge pressure) of the centrifuge machine is preferably 0.03 to 1.6 MPa.

In the production method of the present invention, the conditions can be appropriately balanced, thereby allowing the remaining amount of the rosinate in the emulsified liquid after the concentration step to be in the above range. Alternatively, in the production method of the present invention, the emulsified liquid may be concentrated by a method other than centrifugation, to thereby allow the remaining amount of the rosinate to be in the above range in the concentration step, or the emulsified liquid concentrated by centrifugation or a method other than centrifugation may be subjected to concentration adjustment, to thereby allow the remaining amount of the rosinate to be in the above range.

In the production method of the present invention, the solid content concentration of the emulsified liquid concentrated in the concentration step is preferably 40 to 70% by weight, more preferably 40 to 70% by weight, further preferably 50 to 65% by weight. The solid content concentration can be in the above range, thereby not only suppressing separation of a polymer particle in storage of the resulting polymer latex, but also suppressing the occurrence of a coarse aggregate due to polymer particle aggregation.

Herein, when the concentration step is performed by the above-mentioned centrifugation, the conditions of the centrifugation may be adjusted such that the solid content concentration of a light liquid obtained by the centrifugation is in the above range, or, if the solid content concentration of the light liquid obtained is higher than the concentration in the above range, the conditions may be adjusted such that the solid content concentration is in the above range by mixing the light liquid with a heavy liquid.

The volume average particle size of the polymer latex produced by the production method of the present invention is preferably 0.1 to 10 µm, more preferably 0.5 to 3 µm, further preferably 1 to 2 µm. The volume average particle size can be in the above range, thereby imparting a proper latex viscosity to thereby facilitate handling, and inhibiting a film from being generated on the latex surface in storage of the polymer latex.

Latex Composition

The latex composition of the present invention is obtained by adding a crosslinking agent to the polymer latex containing synthetic polyisoprene and/or the styrene-isoprene-styrene block copolymer obtained by the production method of the present invention.

Examples of the crosslinking agent include sulfur such as powdered sulfur, sublimed sulfur, precipitated sulfur, colloidal sulfur, surface-treated sulfur and insoluble sulfur; and sulfur-containing compounds such as sulfur chloride, sulfur dichloride, morpholine-disulfide, alkylphenol-disulfide, caprolactam-disulfide, phosphorus-containing polysulfide, polymeric polysulfide and 2-(4'-moipholinodithio)benzothiazole. Among them, sulfur can be preferably used. Such crosslinking agents can be used singly or in combinations of two or more kinds thereof.

The content of the crosslinking agent is not particularly limited, and is preferably 0.1 to 10 parts by weight, more preferably 0.2 to 3 parts by weight based on 100 parts by weight in total of the synthetic polyisoprene and the styrene-isoprene-styrene block copolymer. The content of the crosslinking agent can be in the above range, thereby more enhancing the tensile strength of the resulting dip molded article.

The latex composition of the present invention preferably further contains a crosslinking accelerator.

A crosslinking accelerator usually used in dip molding can be used as the crosslinking accelerator, and examples include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid and dibenzyldithiocarbamic acid, and zinc salts thereof; and 2-mercaptobenzothiazole, zinc 2-mercaptobenzothiazole, 2-mercaptothiazoline, dibenzothiazyl-disulfide, 2-(2,4-dinitrophenylthio)benzothiazole, 2-(N,N-diethylthio-carbarylthio)benzothiazole, 2-(2,6-dimethyl-4-morpholinothio)benzothiazole, 2-(4'-morpholino-dithio) benzothiazole, 4-morpholinyl-2-benzothiazyl-disulfide and 1,3-bis(2-benzothiazyl-mercaptomethyl)urea, and zinc diethyldithiocarbamate, zinc 2-dibutyldithiocarbamate and zinc 2-mercaptobenzothiazole are preferable. Such crosslinking accelerators can be used singly or in combinations of two or more kinds thereof.

The content of the crosslinking accelerator is preferably 0.05 to 5 parts by weight, more preferably 0.1 to 2 parts by weight based on 100 parts by weight in total of the synthetic polyisoprene and the styrene-isoprene-styrene block copolymer. The content of the crosslinking accelerator can be in the above range, thereby more enhancing the tensile strength of the resulting dip molded article.

The latex composition of the present invention preferably further contains zinc oxide.

The content of the zinc oxide is not particularly limited, and is preferably 0.1 to 5 parts by weight, more preferably 0.2 to 2 parts by weight based on 100 parts by weight in total of the synthetic polyisoprene and the styrene-isoprene-styrene block copolymer. The content of the zinc oxide can be in the above range, thereby more enhancing the tensile strength of the resulting dip molded article, with emulsification stability being favorable.

To the latex composition of the present invention can be, if necessary, compounded a compounding agent, for example, an antioxidant; a dispersing agent; a reinforcement agent such as carbon black, silica or talc; a filler such as calcium carbonate or clay; an ultraviolet absorber; or a plasticizer.

Examples of the antioxidant include phenol-based antioxidants containing no sulfur atom, such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenol, and a butylated reaction product of p-cresol and dicyclopentadiene; thiobisphenol-based antioxidants such as 2,2'-thiobis-(4-methyl-6-t-butylphenol), 4,4'-thiobis-(6-t-butyl-o-cresol) and 2,6-di-t-butyl-4-(4,6-bis(octylthio)-1,3,5-triazine-2-ylamino)phenol; phosphorous acid ester-based antioxidants such as tris(nonylphenyl)phosphite, diphenylisodecyl phosphite and tetraphenyl dipropylene glycol-diphosphite; sulfur ester-based antioxidants such as dilauryl thiodipropionate; amine-based antioxidants such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine and a butylaldehyde-aniline condensate; quinoline-based antioxidants such as 6-ethoxy-2,2,4-trimethyl-1,2-dihydroquinone; and hydroquinone-based antioxidants such as 2,5-di-(t-amyl)hydroquinone. Such antioxidants can be used singly or in combinations of two or more kinds thereof.

The content of the antioxidant is preferably 0.05 to 10 parts by weight, more preferably 0.1 to 5 parts by weight based on 100 parts by weight in total of the synthetic polyisoprene and the styrene-isoprene-styrene block copolymer.

Examples of the method for preparing the latex composition of the present invention include, but are not particularly limited, a method including mixing the crosslinking agent and various compounding agents, if necessary compounded, with the polymer latex containing synthetic polyisoprene and/or a styrene-isoprene-styrene block copolymer by use of a dispersing machine such as a ball mill, a kneader or a disper, and a method including preparing an aqueous dispersion liquid of compounding components other than the polymer latex containing synthetic polyisoprene and/or a styrene-isoprene-styrene block copolymer, by use of the above dispersing machine, and thereafter mixing the aqueous dispersion liquid with the polymer latex containing synthetic polyisoprene and/or a styrene-isoprene-styrene block copolymer.

The pH of the latex composition of the present invention is preferably 7 or more, more preferably in the range of 7 to 13, further preferably in the range of 8 to 12. The solid content concentration of the latex composition is preferably in the range of 15 to 65% by weight.

The latex composition of the present invention is preferably subjected to aging (pre-crosslinking) before dip molding from the viewpoint that mechanical properties of the resulting dip molded article are more enhanced. The pre-crosslinking time is not particularly limited and is preferably 1 to 14 days, more preferably 1 to 7 days, depending on the pre-crosslinking temperature. Herein, the pre-crosslinking temperature is preferably 20 to 40° C.

The resultant is preferably stored at a temperature of 10 to 30° C. for the period from completion of the pre-crosslinking to dip molding. If the resultant is stored at a high temperature, the tensile strength of the resulting dip molded article may be reduced.

Dip Molded Article

The dip molded article of the present invention is obtained by dip molding the latex composition of the present invention. Dip molding means a method including dipping a mold in the latex composition to deposit the composition on the surface of the mold, then lifting the mold from the composition, and thereafter drying the composition deposited on the surface of the mold. Herein, the mold before dipping in the latex composition may be pre-heated. A coagulating agent can be, if necessary, used before the mold is dipped in the latex composition or after the mold is lifted from the latex composition.

Specific example of the method of using the coagulating agent preferably include a method including dipping the mold before dipping in the latex composition, in a solution of the coagulating agent, to attach the coagulating agent to the mold (anode coagulation dipping method) and a method including dipping the mold on which the latex composition is deposited, in a coagulating agent solution (Teague coagulation dipping method), and an anode coagulation dipping method is preferable from the viewpoint that a dip molded article small in thickness variation is obtained.

Specific examples of the coagulating agent include water-soluble polyvalent metal salts, for example, metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Among them, a calcium salt is preferable, and calcium nitrate is more preferable. Such water-soluble polyvalent metal salts can be used singly or in combinations of two or more kinds thereof.

The coagulating agent is preferably used in the form of an aqueous solution. The aqueous solution may further contain a water-soluble organic solvent such as methanol or ethanol, and/or a nonionic surfactant. The concentration of the coagulating agent varies depending on the type of the water-soluble polyvalent metal salt, and is preferably 5 to 50% by weight, more preferably 10 to 30% by weight.

After the mold is lifted from the latex composition, the deposit famed on the mold usually by heating is dried. The drying conditions may be appropriately selected.

Next, the deposit famed on the mold by heating is crosslinked.

While the heating conditions in crosslinking are not particularly limited, the heating temperature is preferably 60 to 150° C., more preferably 100 to 130° C., and the heating time is preferably 10 to 120 minutes.

Examples of the heating method include, but are not particularly limited, a method of heating by hot air in an oven and a method of heating by irradiation with infrared light.

In order to remove water-soluble impurities (for example, excessive surfactant and/or coagulating agent) before or after heating the mold on which the latex composition is deposited, the mold is preferably washed with water or warm water. The warm water used is preferably at 40° C. to 80° C., more preferably at 50° C. to 70° C.

The dip molded article after crosslinking is detached from the mold. Specific examples of the detaching method include a method for releasing the article from the mold by hand and a method for releasing the article by water pressure or compressed air pressure. When the dip molded article during crosslinking has a sufficient strength for detaching, the dip molded article may be detached during crosslinking and continuously subsequently crosslinked.

The dip molded article of the present invention is obtained using the polymer latex of synthetic polyisoprene and/or a styrene-isoprene-styrene block copolymer, obtained by the production method of the present invention, and is thus excellent in tensile strength and can be particularly suitably used as a glove. When the dip molded article is a glove, an inorganic fine particle of talc, calcium carbonate or the like, or an organic fine particle such as a starch particle may be spread on the glove surface, an elastomer layer containing a fine particle may be famed on the glove surface, or the surface layer of the glove may be chlorinated, in order to prevent adhesion on the contact surface of the dip molded article to thereby enhance slipping during detachment.

The dip molded article of the present invention can also be used in, other than the glove, medical products such as a nipple for baby bottles, a dropper, a tube, a water cushion, a balloon sack, a catheter and a condom; toys such as an air ball, a doll and a ball; industrial products such as a bag for pressure molding and a bag for gas storage; and a fingerstall.

Adhesive Composition

In the present invention, the above-mentioned polymer latex of the present invention can be used as an adhesive composition.

The content (solid content) of the synthetic polyisoprene and/or styrene-isoprene-styrene block copolymer in the adhesive composition is preferably 5 to 60% by weight, more preferably 10 to 30% by weight.

The adhesive composition preferably contains an adhesive resin in addition to the polymer latex of the present invention. The adhesive resin is not particularly limited, for example, a resorcin-formaldehyde resin, a melamine resin, an epoxy resin and an isocyanate resin can be suitably used, and among them, a resorcin-formaldehyde resin is preferable. A known resorcin-formaldehyde resin (for example, one disclosed in Japanese Patent Laid-Open No. 55-142635) can be used as the resorcin-formaldehyde resin. The reaction ratio of resorcin and formaldehyde is usually 1:1 to 1:5, preferably 1:1 to 1:3 in terms of the molar ratio "resorcin: formaldehyde".

The adhesive composition can also contain 2,6-bis(2,4-dihydroxyphenylmethyl)-4-chlorophenol or an analogue compound, isocyanate, block isocyanate, ethylene urea, polyepoxide, a modified vinyl chloride resin, and the like conventionally used, for a further enhancement in adhesion force of the adhesive composition.

The adhesive composition can further contain a vulcanization aid. A vulcanization aid can be contained, thereby enhancing the mechanical strength of a composite described below, obtained by use of the adhesive composition.

Examples of the vulcanization aid include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate) and TAIC (triallyl isocyanurate); maleimide compounds such as bismaleimide, phenylmaleimide and N,N-m-phenylenedimaleimide; and sulfur.

Adhesive Layer Formation Substrate

The adhesive layer formation substrate of the present invention is obtained by forming an adhesive layer famed by use of the polymer latex or the adhesive composition of the present invention, on a substrate surface.

The substrate is not particularly limited, and for example, a fiber substrate can be used. The type of a fiber constituting the fiber substrate is not particularly limited, and examples thereof include polyamide fibers such as a vinylon fiber, a polyester fiber, nylon, aramid (aromatic polyamide), a glass fiber, cotton, and rayon. These can be appropriately selected depending on the intended use. The shape of the fiber substrate is not particularly limited, examples thereof can include staple, filament, a cord shape, a rope shape, and a woven cloth (sailcloth and the like), and such shapes can be appropriately selected depending on the intended use. For example, the adhesive layer formation substrate can adhere to rubber with the adhesive layer interposed therebetween, and thus used as a substrate-rubber composite. Examples of the substrate-rubber composite include, but are not particularly limited, a rubber toothed belt including a core wire, in which a cord-shaped substrate is used as a fiber substrate, and a rubber toothed belt in which a foundation cloth-like fiber substrate such as a sail cloth is used.

Examples of the method for obtaining the substrate-rubber composite include, but are not particularly limited, a method including attaching the polymer latex or the adhesive composition of the present invention to a substrate by a dipping treatment or the like, to thereby obtain the adhesive layer formation substrate, disposing the adhesive layer formation substrate on rubber, and heating and pressurizing the resultant. Such pressurizing can be performed by use of a compression (press) molding machine, a metal roll, an injection molding machine or the like. The pressure in such pressurizing is preferably 0.5 to 20 MPa, more preferably 2 to 10 MPa. The temperature in such heating is preferably 130 to 300° C., more preferably 150 to 250° C. The treatment time for such heating and pressurizing is preferably 1 to 180 minutes, more preferably 5 to 120 minutes. Such a heating and pressurizing method enables molding of rubber and adhesion of the adhesive layer formation substrate and the rubber to be simultaneously performed. It is herein preferable to form a mold for providing a desired surface shape on the rubber of an objective substrate-rubber composite, on the inner surface and/or roll surface of a mold of a compression machine for use in such pressurizing.

One aspect of the substrate-rubber composite can include a substrate-rubber-substrate complex. The substrate-rubber-substrate complex can be famed by, for example, combining a substrate (which may be a complex of two or more substrates) and the substrate-rubber composite. Specifically, the substrate-rubber-substrate complex can be obtained by stacking a core wire serving as the substrate, rubber, and a foundation cloth serving as the substrate (where the polymer latex or the adhesive composition of the present invention is appropriately attached to the core wire and the foundation cloth to provide the adhesive layer formation substrate), and pressurizing the stacked product with heating.

The substrate-rubber composite obtained by use of the adhesive layer formation substrate of the present invention is excellent in mechanical strength, wear resistance and water resistance, and therefore can be suitably used for a belt such as a flat belt, a V-belt, a V-ribbed belt, a round belt, a square belt or a toothed belt. The substrate-rubber composite obtained by use of the adhesive layer formation substrate of the present invention is excellent in oil resistance and can also be suitably used for an oil immersed belt. Furthermore, the substrate-rubber composite obtained by use of the adhesive layer formation substrate of the present invention can also be suitably used for a hose, a tube, a diaphragm or the like. Examples of the hose include a single-tube rubber hose, a multilayer rubber hose, a knitted reinforced hose and a cloth-wrapped reinforced hose. Examples of the diaphragm include a flat diaphragm and a rolling type diaphragm.

The substrate-rubber composite obtained by use of the adhesive layer formation substrate of the present invention can be used for industrial products such as a seal and a rubber roll, in addition to the above applications. Examples of the seal include moving part seals such as rotary, rocking, and reciprocally moving seals, and fixing part seals. Examples of the moving part seal include an oil seal, a piston seal, a mechanical seal, boot, a dust cover, a diaphragm, and an accumulator. Examples of the fixing part seal include an O ring and various gaskets. Examples of the rubber roll include rolls as parts for OA equipment such as a printer and a copier; rolls for fiber processing, such as a stretching roll for spinning and a draft roll for spinning; and rolls for iron-making, such as a bridle roll, a snubber roll and a steering roll.

EXAMPLES

Hereinafter, the present invention will be more specifically described with reference to Examples and Comparative Examples, but the present invention is not intended to be limited to such Examples. Hereinafter, unless particularly noted, "part(s)" is on a weight basis. The test or evaluation methods of physical properties and characteristics are as follows.

Weight Average Molecular Weight (Mw) and Molecular Weight Distribution (Mw/Mn)

Dilution with tetrahydrofuran was made so that the solid content concentration of the synthetic polyisoprene or styrene-isoprene-styrene block copolymer included in the polymer solution was 0.1% by weight, and the solution was subjected to gel permeation chromatography analysis to calculate the weight average molecular weight (Mw) and the molecular weight distribution (Mw/Mn) in terms of standard polystyrene.

Solid Content Concentration

Two g of a sample was accurately weighed (weight: X2) in an aluminum dish (weight: X1), and dried at 105° C. in a hot air drier for 2 hours. Next, the dried product was cooled in a desiccator and weighed together with the aluminum dish (weight: X3), and the solid content concentration was calculated according to the following calculation expression.

Solid content concentration (% by weight)=($X3-X1$)×100/$X2$

Potassium Rosinate Content Rate 2 ml of water was added to 0.1 g of the emulsified liquid or polymer latex, which was then diluted with acetonitrile to 10 ml. The resulting liquid was well shaken, and the rubber content was coagulated. Thereafter, the aqueous layer was filtered by a 0.2-μm disc filter. The liquid was analyzed by high performance liquid chromatography, and the potassium rosinate content rate (unit: parts by weight) based on 100 parts of the synthetic polyisoprene or styrene-isoprene-styrene block copolymer was calculated.

Aggregate Content Rate

The solid content concentration of the polymer latex was measured, about 100 g of the polymer latex was accurately weighed and thereafter filtered through a 200-mesh SUS wire cloth having a known weight, and an aggregate on the wire cloth was washed with water several times to remove the polymer latex. After the aggregate was dried at 105° C. for 60 minutes, the dry weight thereof was measured to determine the aggregate content rate (unit: % by weight) based on the following expression:

Aggregate content rate=$\{(\alpha-\beta)/(\gamma\times\Delta)\}\times10{,}000$ wherein $\alpha$, $\beta$, $\gamma$, and $\Delta$ represent the weight of the wire cloth after drying and the dried aggregate, the weight of the wire cloth, the weight of the polymer latex, and the weight of the total solid content of the polymer latex, respectively.

Foaming Evaluation

Foaming of the emulsified liquid during distillation under reduced pressure in the solvent removal step was visually observed, and evaluated according to the following criteria.

A: foaming was not almost confirmed.

B: while foaming was confirmed, the amount thereof was slight.

C: foaming was remarkable.

Mechanical Stability

The mechanical stability was evaluated according to the method described in "Determination of Mechanical Stability" in ASTM D1417-10.

The mechanical stability was measured using MS-5114 (Ueshima Seisakusho Co., Ltd.) or LL5110NA MK3 (Source 2 trade Ltd). Herein, a stirring disc was used in which the diameter and the thickness, prescribed in ASTM D1076-10, were 20.83 (mm)±0.03 and 1.57 (mm)±0.05 (mm), respectively. As a glass beaker was used a glass beaker prescribed in ASTM D1417-10, in which the inner diameter was 57.8 (mm)±1 (mm). Fifty g of the polymer latex was accurately weighed and stirred under a condition of a number of rotations of 14,000 rpm for 30 minutes. The polymer latex after stirring was filtered through an 80-mesh wire cloth. Thereafter, the mesh was washed with soap water and the soap was washed off with distilled water, and thereafter the resultant was dried at 105° C. for 2 hours. After the drying, the residue substance on the wire cloth was weighed, and the ratio (unit: % by weight) relative to 50 g of the polymer latex was calculated and the mechanical stability was evaluated based on the resulting value. As the value is smaller, the mechanical stability is more excellent.

Tensile Strength of Dip Molded Article

The tensile strength of the dip molded article was measured based on ASTM D412. Specifically, the dip molded article was subjected to punching by a dumbbell (Die-C) to produce a test piece for measurement, and the resulting test piece was pulled at a tensile rate of 500 mm/min by a Tensilon universal tester ("RTC-1225A" manufactured by ORIENTEC Co., LTD) to measure the tensile strength (unit: MPa) immediately before breakage.

Example 1

(Production of Polymer Solution of Synthetic Polyisoprene)

An autoclave equipped with a stirrer, dried and purged with nitrogen, was charged with 1150 parts of cyclohexane, 100 parts of isoprene and 0.04 parts of tetramethylethylenediamine. The temperature in the autoclave was set to 60° C., and 0.1105 parts of a hexane catalyst solution containing 15.6% by weight of n-butyllithium was added with stirring to allow a reaction to run for 1 hour. The polymerization reaction rate was 99%. To the resulting polymer solution was added 0.0831 parts of methanol as a polymerization terminator, to terminate the reaction, thereby obtaining polymer solution (A-1) of synthetic polyisoprene. The synthetic polyisoprene had a weight average molecular weight (Mw) of 677,000 and a molecular weight distribution (Mw/Mn) of 1.99.

(Production of Polymer Latex)

Next, a total amount of 1250 parts of polymer solution (A-1) of synthetic polyisoprene (100 parts of the synthetic polyisoprene and 1150 parts of cyclohexane) and 1250 parts of an aqueous surfactant solution containing 0.8% by weight (10 parts relative to the synthetic polyisoprene) of potassium rosinate were prepared.

(Emulsification Step)

The total amount of the polymer solution of synthetic polyisoprene and the total amount of the aqueous surfactant solution were placed in a SUB304 container, and stirred and mixed, and subsequently subjected to an emulsifying dispersion treatment by a homogenizer (trade name "Milder MDN-303V", manufactured by Pacific Machinery & Engineering Co., Ltd.), to thereby obtain emulsified liquid (B-1). The potassium rosinate content rate and the aggregate content rate in emulsified liquid (B-1) obtained were measured according to the above-mentioned method. The results are shown in Table 1.

(Solvent Removal Step)

Next, emulsified liquid (B-1) obtained in the emulsification step was transferred to a tank for solvent removal, and distilled under reduced pressure, thereby obtaining emulsified liquid (C-1) from which cyclohexane was removed. Herein, the distillation time was 6 hours. The solid content concentration of emulsified liquid (C-1) from which cyclohexane was removed was 10% by weight. A 200-mesh stainless steel wire cloth was then used to remove an aggregate in emulsified liquid (C-1). Herein, the amount of foaming of emulsified liquid (B-1) during distillation off of cyclohexane was evaluated according to the above criteria. The results are shown in Table 1.

(Concentration Step)

Next, the solvent was further removed from emulsified liquid (C-1) from which cyclohexane was removed, thereby adjusting the solid content concentration to 20% by weight. Thereafter, a rotor MN was mounted in a cooled centrifuge (Model "H-2000B", manufactured by Kokusan Co., Ltd.), emulsified liquid (C-1) was placed in a centrifuge tube having a volume of 500 ml, and a centrifugation operation was performed under conditions of a preset temperature of 20° C., a centrifugal acceleration of 4,000 G and a treatment time of 20 minutes. After rotation was stopped, polymer latex (D-1) was immediately obtained as a light liquid from the centrifuge tube. Polymer latex (D-1) obtained was mixed with a heavy liquid, and the solid content concentration was adjusted to 60% by weight (E-1). The potassium rosinate content rate and the mechanical stability of polymer latex (E-1) obtained were measured according to the above-mentioned method. The results are shown in Table 1.

(Preparation of Latex Composition)

While polymer latex (E-1) obtained was stirred, 1.5 parts of zinc oxide, 1.5 parts of sulfur, 3 parts of an antioxidant (trade name "Wingstay L", manufactured by Goodyear Tire and Rubber Company), 0.3 parts of zinc diethyldithiocarbamate, 0.5 parts of zinc dibutyldithiocarbamate and 0.7 parts of zinc mercaptobenzothiazole, in terms of the solid content based on 100 parts of the synthetic polyisoprene in polymer latex (E-1), were added in the form of water dispersion liquids of such respective compounding agents, and thereafter an aqueous potassium hydroxide solution was added to thereby obtain a latex composition in which the pH was adjusted to 10.5. Thereafter, the resulting latex composition was aged in a constant temperature water bath adjusted at 30° C., for 48 hours.

(Production of Dip Molded Article)

A commercially available ceramic hand mold (manufactured by Shinko Ceramics Co., Ltd.) was washed, pre-heated in an oven at 70° C., thereafter dipped in an aqueous coagulating agent solution including 18% by weight of calcium nitrate and 0.05% by weight of polyoxyethylene lauryl ether (trade name "Emulgen 109P", produced by Kao Corporation) for 5 seconds, and then taken out. Next, the hand mold covered with the coagulating agent was dried in an oven at 70° C. for 30 minutes or more.

Thereafter, the hand mold covered with the coagulating agent was taken out from the oven, and dipped in the latex composition for 10 seconds. Next, the hand mold was air dried at room temperature for 10 minutes and then dipped in warm water at 60° C. for 5 minutes. Furthermore, the hand mold was placed in an oven at 130° C., subjected to vulcanization for 30 minutes and thereafter cooled to room temperature, talc was spread thereon, and then peeling off from the hand mold was made to thereby obtain a dip molded article. The tensile strength of the resulting dip molded article was measured according to the above-mentioned method. The results are shown in Table 1.

Example 2

The same manner as in Example 1 was performed except that the amount of potassium rosinate in the aqueous surfactant solution for use in the emulsification step, in tams of the solid content concentration, and the distillation time in the solvent removal step were changed to 25 parts and 11 hour, respectively, thereby producing polymer latex (E-2). The same manner as in Example 1 was performed in preparation of a latex composition, production of a dip molded article, and evaluation except that polymer latex (E-2) obtained was used. The results are shown in Table 1.

Example 3

The same manner as in Example 1 was performed except that the solid content concentration in preparation of the emulsified liquid before centrifugation was adjusted to 10% by weight to thereby obtain emulsified liquid (B-3) and emulsified liquid (B-3) was used, thereby producing polymer latex (E-3). The same manner as in Example 1 was performed in preparation of a latex composition, production of a dip molded article, and evaluation except that polymer latex (E-3) obtained was used. The results are shown in Table 1.

Example 4

The same manner as in Example 1 was performed except that polymer solution (A-4) obtained by dissolving a styrene-isoprene-styrene block copolymer (SIS) (trade name "QUINTAC 3620", produced by Zeon Corporation) in a cyclohexane solution such that the concentration was 8% by weight was used instead of polymer solution (A-1) of synthetic polyisoprene in Example 1 and also the distillation time in the solvent removal step was changed to 7 hours, thereby producing polymer latex (E-4). The same manner as in Example 1 was performed in preparation of a latex composition, production of a dip molded article, and evaluation except that polymer latex (E-4) obtained was used. The results are shown in Table 1.

Comparative Example 1

The same manner as in Example 1 was performed except that the amount of potassium rosinate in the aqueous surfactant solution for use in the emulsification step, in tams of the solid content concentration, and the distillation time in the solvent removal step were changed to 0.05 parts and 4 hours, respectively, thereby producing polymer latex (E-5). In Comparative Example 1, the aggregate content rate of the emulsified liquid obtained in the emulsification step was high, and the emulsified liquid was then solidified during centrifugation in the concentration step and no polymer latex (E-5) could be recovered. The results are shown in Table 1.

Comparative Example 2

The same manner as in Example 1 was performed except that the amount of potassium rosinate in the aqueous surfactant solution for use in the emulsification step, in tams of the solid content concentration, and the distillation time in the solvent removal step were changed to 35 parts and 18 hours, respectively, thereby producing polymer latex (E-6). The same manner as in Example 1 was performed in preparation of a latex composition, production of a dip molded article, and evaluation except that polymer latex (E-6) obtained was used. The results are shown in Table 1.

Comparative Example 3

The same manner as in Example 1 was performed except that the solid content concentration in preparation of the emulsified liquid before centrifugation was adjusted to 10% by weight to thereby obtain emulsified liquid (B-7) and emulsified liquid (B-7) was used, thereby producing polymer latex (E-7). The same manner as in Example 1 was performed in preparation of a latex composition, production of a dip molded article, and evaluation except that polymer latex (E-7) obtained was used. The results are shown in Table 1.

Comparative Example 4

The same manner as in Example 1 was performed except that the solid content concentration in preparation of the emulsified liquid before centrifugation was adjusted to 10% by weight to thereby obtain emulsified liquid (B-8) and emulsified liquid (B-8) was used, thereby producing polymer latex (E-8). In Comparative Example 4, many aggregates occurred in polymer latex (E-8) in preparation of the latex composition, and no dip molded article could be produced. The results are shown in Table 1.

Comparative Example 5

The same manner as in Example 1 was performed except that the conditions in centrifugation in the concentration step were changed to a centrifugal acceleration of 25,000 G and a treatment time of 1 minute, thereby producing polymer latex (D-9). In Comparative Example 5, the emulsified liquid aggregated during centrifugation and no polymer latex (D-9) could be recovered. The results are shown in Table 1.

Comparative Example 6

The same manner as in Example 1 was performed except that the conditions in centrifugation in the concentration step were changed to a centrifugal acceleration of 50 G and a treatment time of 100 minutes, thereby producing polymer latex (E-10). In Comparative Example 6, polymer latex (E-10) having a solid content concentration of 30% by weight was obtained by centrifugation, but the amount of potassium rosinate in the polymer latex after centrifugation was too large, it was thus determined that a dip molded article having a sufficient tensile strength could not be obtained even if the polymer latex was used, and neither production of a dip molded article nor evaluation of the tensile strength was performed. The results are shown in Table 1.

From Table 1, when the polymer solution of synthetic polyisoprene or a styrene-isoprene-styrene block copolymer was mixed with an aqueous solution including 0.1 to 30 parts of a rosinate and the resultant was emulsified to thereby obtain an emulsified liquid, and the organic solvent in the emulsified liquid was removed and thereafter the emulsified liquid was concentrated to allow the content rate of the rosinate in the emulsified liquid to be 0.1 to 3 parts, foaming in the course of production of the polymer latex was suppressed, furthermore the mechanical stability of the polymer latex was excellent, and also a dip molded article high in tensile strength was obtained (Examples 1 to 4).

On the other hand, when the amount of potassium rosinate in the emulsified liquid for use in the emulsification step, in tams of the solid content concentration, was less than 0.1 parts, the aggregate content rate of the emulsified liquid after the emulsification step was high, and the emulsified liquid was then solidified in centrifugation in the concentration step and no polymer latex could be recovered (Comparative Example 1).

TABLE 1

| | | Emulsification step | | | | Concentration step | |
|---|---|---|---|---|---|---|---|
| | | Potassium rosinate | Aggregate | Solvent removal step | | Solid content concentration | |
| | Type of polymer | content rate (parts by weight) | content rate (% by weight) | Foaming evaluation | Distillation time (hr) | (% by weight) before centrifugation | Centrifugal acceleration (G) |
| Example 1 | Synthetic polyisoprene | 10 | <5 | A | 6 | 20 | 4000 |
| Example 2 | Synthetic polyisoprene | 25 | <5 | B | 11 | 20 | 4000 |
| Example 3 | Synthetic polyisoprene | 10 | <5 | A | 6 | 10 | 4000 |
| Example 4 | SIS | 10 | <5 | A | 7 | 20 | 4000 |
| Comparative Example 1 | Synthetic polyisoprene | 0.05 | >30 | A | 4 | 20 | 4000 |
| Comparative Example 2 | Synthetic polyisoprene | 35 | <5 | C | 18 | 20 | 4000 |
| Comparative Example 3 | Synthetic polyisoprene | 10 | <5 | A | 6 | 50 | 4000 |
| Comparative Example 4 | Synthetic polyisoprene | 10 | <5 | A | 6 | 2 | 4000 |
| Comparative Example 5 | Synthetic polyisoprene | 10 | <5 | A | 6 | 20 | 25000 |
| Comparative Example 6 | Synthetic polyisoprene | 10 | <5 | A | 6 | 20 | 50 |

| | Concentration step | | | | |
|---|---|---|---|---|---|
| | Treatment time (min) | Solid content concentration (% by weight) after centrifugation | Potassium rosinate content rate (parts by weight) after centrifugation | Mechanical stability (% by weight) after centrifugation | Dip molding Tensile strength (MPa) |
| Example 1 | 20 | 60 | 1.2 | <0.01 | 24 |
| Example 2 | 20 | 60 | 2.5 | <0.01 | 20 |
| Example 3 | 20 | 60 | 0.4 | <0.01 | 19 |
| Example 4 | 20 | 60 | 1.3 | <0.01 | 23 |
| Comparative Example 1 | 20 | 60 | Not measured | Not measured | Not measured |
| Comparative Example 2 | 20 | 60 | 3.5 | <0.01 | 16 |
| Comparative Example 3 | 20 | 60 | 4.5 | <0.01 | 7 |
| Comparative Example 4 | 20 | 60 | 0.05 | 1.7 | Not measured |
| Comparative Example 5 | 1 | Aggregation | No polymer latex obtained | | |
| Comparative Example 6 | 100 | 30 | 7 | Not measured | Not measured |

When the amount of potassium rosinate in the emulsified liquid for use in the emulsification step, in terms of the solid content concentration, was more than 30 parts, the amount of occurrence of foaming was increased in the course of production of the polymer latex, and productivity of the polymer latex was inferior (Comparative Example 2).

When the amount of potassium rosinate in the polymer latex obtained in the concentration step was more than 3 parts, the resulting dip molded article was inferior in tensile strength (Comparative Examples 2 and 3).

When the amount of potassium rosinate in the polymer latex obtained in the concentration step was less than 0.1 parts, the polymer latex was inferior in mechanical stability, and no dip molded article could be produced (Comparative Example 4).

When the centrifugal acceleration in centrifugation in the concentration step was too high, the emulsified liquid aggregated during centrifugation and no polymer latex could be recovered (Comparative Example 5).

Furthermore, when the centrifugal acceleration in centrifugation in the concentration step was too low, the amount of potassium rosinate in the polymer latex after the concentration step was too large, it was thus determined that a dip molded article having a sufficient tensile strength could not be obtained even if the polymer latex was used, and neither production of a dip molded article nor evaluation of the tensile strength was performed (Comparative Example 6).

The invention claimed is:

1. A method for producing a polymer latex, comprising:
   an emulsification step of mixing a polymer solution obtained by dissolution of synthetic polyisoprene and/or a styrene-isoprene-styrene block copolymer in an organic solvent, with an aqueous solution comprising 0.1 to 15 parts by weight of a rosinate based on 100 parts by weight in total of the synthetic polyisoprene and the styrene-isoprene-styrene block copolymer, and emulsifying the resultant in water to thereby obtain an emulsified liquid;
   a solvent removal step of removing the organic solvent in the emulsified liquid; and
   a concentration step of concentrating the emulsified liquid from which the organic solvent is removed, and also adjusting a content rate of the rosinate in the emulsified liquid in the range of 0.1 to 3 parts by weight based on 100 parts by weight in total of the synthetic polyisoprene and the styrene-isoprene-styrene block copolymer in the emulsified liquid,
   wherein an amount of water for use in the emulsification step is 50 to 100 parts by weight based on 100 parts by weight of the polymer solution of the synthetic polyisoprene and the styrene-isoprene-styrene block copolymer.

2. The method for producing a polymer latex according to claim 1, wherein the emulsified liquid is concentrated by centrifugation in the concentration step.

3. The method for producing a polymer latex according to claim 2, wherein the centrifugation is performed under a condition of a centrifugal acceleration of 100 to 20,000 G.

4. The method for producing a polymer latex according to claim 1, wherein the concentration is performed in the concentration step by use of, as the emulsified liquid, an emulsified liquid that is adjusted to have a solid content concentration in the range of 1 to 40% by weight.

5. The method for producing a polymer latex according to claim 1, wherein the emulsified liquid is concentrated such that a solid content concentration of the emulsified liquid after concentration in the concentration step is 40 to 70% by weight.

6. The method for producing a polymer latex according to claim 1, wherein the polymer solution is a polymer solution obtained by dissolving, in an organic solvent, the synthetic polyisoprene obtained by solution polymerization of a monomer comprising isoprene dissolved in an organic solvent, and/or the styrene-isoprene-styrene block copolymer obtained by solution polymerization of a styrene-containing monomer and an isoprene-containing monomer, dissolved in an organic solvent, and
   the emulsified liquid is obtained by directly emulsifying the polymer solution in water without coagulation in the emulsification step.

7. A method for producing a latex composition, comprising a step of adding a crosslinking agent to a polymer latex obtained by the method according to claim 1.

8. A method for producing a dip molded article, comprising a step of dip molding a latex composition obtained by the method according to claim 7.

9. A method for producing an adhesive layer formation substrate, comprising a step of forming an adhesive layer formed by use of a polymer latex obtained by the method according to claim 1, on a substrate surface.

* * * * *